E. P. Gleason.
Chimney Holder for Gas-Burners.
No. 2813. Reissued Dec. 17, 1867.
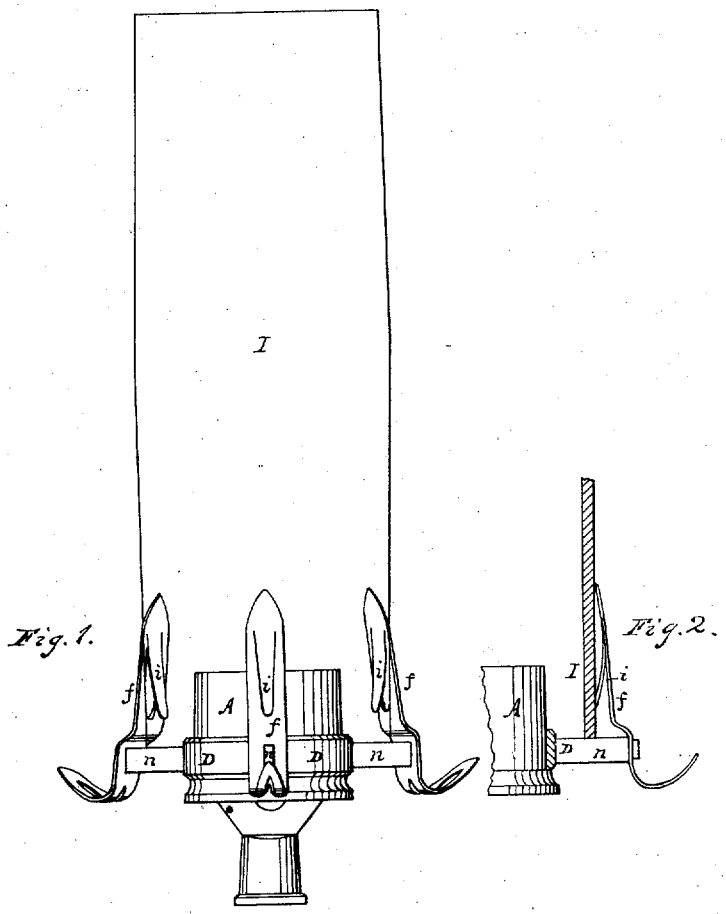
Witnesses.
Wm. A. McKenney
J. M. Kenney
Inventor.
Elliott P. Gleason
by his Atty
Franc A. Brunner

United States Patent Office.

ELLIOTT P. GLEASON, OF NEW YORK, N. Y.

*Letters Patent No.* 59,588, *dated November* 13, 1866; *reissue No.* 2,813, *dated December* 17, 1867.

IMPROVEMENT IN CHIMNEY-HOLDERS FOR GAS-BURNERS.

The Schedule referred to in these Letters Patent and making part of the same.

TO ALL WHOM IT MAY CONCERN:

Be it known that I, ELLIOTT P. GLEASON, of the city, county, and State of New York, have invented, made, and applied to use certain new and useful Improvements in Chimney-Holders for Lighting-Apparatus; and I do declare that the following is a full, clear, and correct description of my invention, reference being had to the accompanying drawings, making part of this specification, and to the letters of reference marked thereon, in which—

Figure 1 is an elevation of my improved chimney-holder applied to an argand gas-burner, and Figure 2 a section of the same.

In the drawings like parts of the invention are indicated by the same letters of reference.

The nature of my invention consists in certain new and useful improvements in the construction of chimney-holders, as more fully hereinafter set forth.

To enable those skilled in the arts to make and use my invention, I will proceed to describe the same.

The chimney-holder consists of a ring, D, fitting the body A of a gas-burner, with a number of radial arms, *n*, for supporting the weight of the chimney I, and at the end of each arm is riveted a spring, *f*, which bears against the chimney I to hold it securely in its place over the gas-burner. This spring *f* is formed of a strip or plate of metal, riveted to the arm *n*, so as to bring the flat portion of the strip or plate of metal forming it directly against the chimney, while the arm *n* is riveted to the ring D so as to present its narrow end as the point to which the spring *f* is riveted. The strip or plate of sheet metal, before being riveted to the arm *n*, is bent forward sufficiently, so that when riveted to the arm *n* it shall form a spring against which the sides of the chimney, when inserted, shall bear. *i* shows a second spring or spring-tongue, formed from the plate or strip of sheet metal forming the spring *f*, by punching it in form from the body of the strip or plate of metal, in which case the stiffness of the spring *f* is reduced, and the pressure of the two springs upon the chimney is in a measure equalized; or the spring *i* may be formed of a separate piece of metal and riveted to the spring *f*, in which case the spring *i* is made semi-elliptic in form, with its ends curved, and is so riveted to the spring *f* that the upper curved portion shall extend above the point of riveting, and the lower curved portion shall extend below the point of riveting.

It will be observed that the strip or plate of sheet metal is bent so as to project forward of the point of riveting to the arm *n*, and this is done to give a bearing from the top to the bottom of the spring when the same embraces the chimney, and also to allow a globe or shade-holder to be securely held upon the curved ends at the base of the spring *f*.

It will further be observed that the plate or strip of sheet metal, forming the spring *f*, is riveted so as to bring the flat portion of the metal directly against the chimney, while the arm *n* is riveted to the ring D, so that its narrow portion is presented to the spring *f*, thus permitting the spring *f* to accommodate itself to the contraction and expansion of the glass chimney, which is of material importance.

The use of the springs *f* and *i*, formed from one and the same piece of sheet metal, or formed by making the spring *i* semi-elliptic, with its ends curved, and riveting it to the spring *f*, as already described, affords an equalizing-spring, embracing the chimney securely, and one which readily accommodates itself to the expansion and contraction of the chimney.

Having thus described my invention, what I claim as new, and desire to secure by Letters Patent, is—

1. The plate or strip forming the spring *f*, bent and curved substantially as described.
2. The spring *f* riveted to the arm *n*, substantially as set forth.
3. The equalizing-spring for chimney-holders, constructed substantially as set forth.

ELLIOTT P. GLEASON.

Witnesses:

A. SIDNEY DOANE,

J. C. GRANGER.